US012271512B2

(12) United States Patent
De Santis et al.

(10) Patent No.: US 12,271,512 B2
(45) Date of Patent: Apr. 8, 2025

(54) METHOD AND DEVICE FOR AUTHENTICATING AN FPGA CONFIGURATION

(71) Applicant: Siemens Aktiengesellschaft, Munich (DE)

(72) Inventors: Fabrizio De Santis, Munich (DE); Markus Dichtl, Neu-Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 497 days.

(21) Appl. No.: 17/413,090

(22) PCT Filed: Nov. 19, 2019

(86) PCT No.: PCT/EP2019/081783
§ 371 (c)(1),
(2) Date: Jun. 11, 2021

(87) PCT Pub. No.: WO2020/120079
PCT Pub. Date: Jun. 18, 2020

(65) Prior Publication Data
US 2022/0043900 A1 Feb. 10, 2022

(30) Foreign Application Priority Data
Dec. 14, 2018 (EP) .................. 18212529
Jan. 31, 2019 (EP) .................. 19154671

(51) Int. Cl.
*G06F 21/76* (2013.01)
*G06F 21/44* (2013.01)
(Continued)

(52) U.S. Cl.
CPC .............. *G06F 21/76* (2013.01); *G06F 21/44* (2013.01); *G06F 21/57* (2013.01); *H04L 9/3236* (2013.01); *H04L 9/3278* (2013.01)

(58) Field of Classification Search
CPC .......... G06F 21/76; G06F 21/57; G06F 21/44; H04L 9/3236; H04L 9/3239; H04L 9/3278
See application file for complete search history.

(56) References Cited

U.S. PATENT DOCUMENTS 6,654,889 B1 * 11/2003 Trimberger ........... H04L 9/3236
713/188
7,143,295 B1 * 11/2006 Trimberger ............. G06F 21/76
713/193
(Continued)

FOREIGN PATENT DOCUMENTS

CN 101925913 A 12/2010
CN 102592068 A 7/2012
(Continued)

OTHER PUBLICATIONS

Eckert Claudia: "Physically Unclonable Functions (PUF)"; Technical University of Munich, Lecture Safe Mobile Systems, Summer semester; Chapter 6; 2010. pp. 46-70 with abstract.
(Continued)

*Primary Examiner* — Zachary A. Davis
(74) *Attorney, Agent, or Firm* — Lempia Summerfield Katz LLC

(57) ABSTRACT

The disclosure relates to a method and a device for authenticating an FPGA configuration. The method includes at least partly reading the configuration of a FPGA by the FPGA itself and calculating a first checksum using the read configuration. The method further includes providing an authentication response which confirms that the FPGA configuration is authentic when the first checksum matches a specified checksum, wherein the reading, calculating, and providing are carried out in an obfuscated manner. The authentication response confirming that the FPGA configuration is authentic is not provided or is only provided with
(Continued)

A - Encrypted checksum
B - Authentication response
C - PUF task
D - PUF response
E - Instantiate components
F - Partially self-read configuration 1 - FPGA
2 - Configuration
3 - Checking component
4 - Storage unit
5 - PUF component
6 - First component
7 - Second component a very low degree of probability when the first checksum and the specified checksum do not match. In this regard, an FPGA may check its own configuration.

15 Claims, 1 Drawing Sheet

(51) Int. Cl.
*G06F 21/57* (2013.01)
*H04L 9/32* (2006.01)

(56) References Cited

U.S. PATENT DOCUMENTS

| | | | |
|---|---|---|---|
| 7,278,128 B1* | 10/2007 | Trimberger | G06F 30/34 |
| | | | 716/117 |
| 7,725,738 B1 | 5/2010 | Langhammer et al. | |
| 9,165,143 B1* | 10/2015 | Sanders | G06F 21/575 |
| 10,031,993 B1* | 7/2018 | Poornachandran | |
| | | | H03K 19/17704 |
| 2003/0204743 A1 | 10/2003 | Devadas et al. | |
| 2009/0210721 A1 | 8/2009 | Phillips | |
| 2015/0012737 A1* | 1/2015 | Newell | G06F 21/44 |
| | | | 713/2 |
| 2016/0019383 A1 | 1/2016 | Hanley | |
| 2018/0167211 A1 | 6/2018 | Falk | |
| 2018/0275193 A1 | 9/2018 | Rouge | |
| 2020/0302047 A1 | 9/2020 | Falk | |
| 2020/0342112 A1* | 10/2020 | Plusquellic | G06F 21/602 |

FOREIGN PATENT DOCUMENTS

| | | |
|---|---|---|
| CN | 105279428 A | 1/2016 |
| CN | 107015880 A | 8/2017 |
| CN | 107735982 A | 2/2018 |
| CN | 108028654 A | 5/2018 |
| CN | 108885658 A | 11/2018 |

OTHER PUBLICATIONS

PCT International Search Report and Written Opinion of International Searching Authority mailed Jan. 27, 2020 corresponding to PCT International Application No. PCT/EP2019/081783.
Yuping Ma et al:; "Design and Implementation of CRC Error Correction for ADS-B System Responding Based on FPGA"; May 8, 2013, pp. 1-5.

* cited by examiner

A - Encrypted checksum
B - Authentication response
C - PUF task
D - PUF response
E - Instantiate components
F - Partially self-read configuration 1 - FPGA
2 - Configuration
3 - Checking component
4 - Storage unit
5 - PUF component
6 - First component
7 - Second component

METHOD AND DEVICE FOR AUTHENTICATING AN FPGA CONFIGURATION

The present patent document is a § 371 nationalization of PCT Application Serial No. PCT/EP2019/081783, filed Nov. 19, 2019, designating the United States, which is hereby incorporated by reference, and this patent document also claims the benefit of European Patent Application No. 18212529.4, filed Dec. 14, 2018, and European Patent Application No. 19154671.2, filed Jan. 31, 2019, which is also hereby incorporated by reference.

TECHNICAL FIELD

FPGAs make it possible to approximately achieve the speed of digital hardware using a chip whose software is reprogrammable.

BACKGROUND

The name FPGA stands for Field Programmable Gate Array. A multiplicity of logic gates with a variable specifiable logic functionality are present on an FPGA chip. The logic functionality may be implemented as a lookup table (LUT). The logic value of a combination is determined by looking up a bit in a table. Any desired n-bit logic function for a small n, (e.g., n=6), may be represented by suitably preassigning the table. In addition to the logic functionality and flip-flops, resources for routing the logic signals are also present on an FPGA chip. They are needed so that input and output values of the gates may reach other locations on the chip.

Logic circuits may be defined in high-level languages such as VHDL or Verilog. The development tools of the manufacturers generate the assignments of the LUTs as well as the routing settings from the high-level language and use them to generate a so-called bitstream which then configures the FPGA.

However, the reprogrammability of an FPGA also constitutes a considerable security risk because an attacker may use this high degree of flexibility for himself. If an attacker may manipulate the bitstream or the configuration of an FPGA, security functions may be switched off, for example, or malicious hardware Trojans may be added to the FPGA system and reduce the security of the system. However, the components of an SoC system (system on a chip) may also result from physical changes in the environment, for example, as a result of undesirable temperature changes. These may arise both unintentionally, (e.g., temperature fluctuations or radiation), and intentionally and deliberately in order to extract the key material of a device, for example, by fault attacks.

Therefore, the protection against FPGA manipulation is a high protection objective both in security-relevant and in safety-relevant FPGA-based control devices. They are intended to be able to prevent or at least detect manipulation. If manipulation of the device is detected, the corresponding event may be processed by the system. For example, the system may be blocked or sensitive data may be deleted.

Therefore, there is a need for methods which provide that there is an authentic configuration on an FPGA. Because industrial applications, in particular, remain in use for a long time, but security requirements may be increased at short notice, it is necessary for the methods for providing an authentic FPGA configuration to be adaptable.

Security mechanisms which are permanently installed in the FPGA chips by the manufacturers and are intended to be used to provide an authentic bitstream are known. In many cases, however, their security has already been compromised by side-channel attacks. In the case of side-channel attacks, the cryptography is not directly attacked, for example, but rather its physical implementation.

Furthermore, the check is carried out only during the operation of starting the FPGA and not during the runtime of the FPGA. In addition, the security mechanisms used do not have any protection against attacks by quantum computers.

Obfuscation methods for protecting FPGA contents are also known.

The obfuscation of hardware and software involves presenting functionality for processing digital information in such a manner that the principles on which the processing is based cannot be discerned by human readers and analyzing software. The aim is to increase the effort for reverse engineering in order to hinder targeted changes or distort the functionality. In this case, all individual operations are openly discernible. The actually required operations may be embedded in a host of operations which do not directly achieve the objective. Furthermore, it is possible to implement hardware or software for two different purposes in an interlaced and obfuscated manner such that an attacker is not able to change one of the functionalities without changing the other.

Methods which combine PUFs and self-reading of FPGAs are also known. However, these methods provide only limited and discontinuous protection.

PUF stands for Physically Unclonable Function. It includes hardware in which each copy behaves differently. Like a fingerprint, a PUF is used to make it possible to uniquely identify a chip or to create a cryptographic key. It is particularly favorable in this case if this different behavior is effected in the same manner again and again in each hardware copy.

U.S. Patent Application Publication No. 2015/0012737 A1 relates to a method for securely starting a processor for executing trusted firmware/software.

U.S. Patent Application Publication No. 2003/0204743 A1 relates to the authentication of integrated circuits. Designing an integrated circuit chip having a multiplicity of measurable physical properties which are difficult to duplicate makes it possible to authenticate the chip by selectively measuring a subset of the physical properties and comparing the measurement results with measurements which have already been stored.

SUMMARY AND DESCRIPTION

The scope of the present disclosure is defined solely by the appended claims and is not affected to any degree by the statements within this summary. The present embodiments may obviate one or more of the drawbacks or limitations in the related art.

An object of the present disclosure is to provide a method and a device for authenticating an FPGA configuration, with the result that an FPGA itself checks the authenticity of its configuration.

This object is achieved by a method for authenticating an FPGA configuration as described herein.

The disclosure therefore provides a method for authenticating an FPGA configuration. The method includes at least partially reading the configuration of an FPGA by the FPGA itself and calculating a first checksum over the configuration which has been read. The method further includes providing an authentication response which confirms that the FPGA configuration is authentic if the first checksum corresponds to a predefined checksum, wherein the reading, the calculating, and the providing are performed in obfuscated form, and wherein the authentication response which confirms that the FPGA configuration is authentic is not provided or is provided only with a very low degree of probability if the first checksum and the predefined checksum do not correspond.

It has been advantageously recognized that, in methods in which a first checksum and a predefined checksum are not explicitly compared, an attack and the analysis of the obfuscation are possible only with difficulty or are not possible at all. In any case, a response is calculated using a first checksum and a predefined checksum. This response is a correct authentication response when the first checksum and the predefined checksum correspond. If the first checksum and the predefined checksum do not correspond, the response may constitute a correct authentication response only with a very low degree of probability. Probabilities which are less than or equal to $2^{-32}$, for example, are considered to be a very low degree of probability.

The authenticity of an FPGA configuration may be advantageously checked using the method of the present disclosure not only when starting up the FPGA but may also be checked during the runtime of the FPGA. In particular, the configuration may be checked repeatedly.

Furthermore, changes to the FPGA configuration, which arise, for example, as a result of manipulation attempts or as a result of random or intentionally caused faults, are detected in an improved manner. The authenticity may be detected and checked at any time irrespective of the security concept of the manufacturer of the FPGA.

The method may be advantageously used in or ported to all FPGAs if the FPGAs support the functionality of reading their configuration themselves. In addition, in contrast to security mechanisms permanently installed by the manufacturers, the method may be updated.

The cryptographic methods used may be advantageously interchanged, as a result of which the method has high crypto-agility.

It is also advantageous that the method is also suitable for post-quantum methods and may be carried out using the latter. It is therefore protected against attacks from quantum computers. A post-quantum method cannot be attacked using a quantum computer.

Furthermore, the security level may be increased by suitably selecting the parameters, for example for encryption.

In addition, the combination of self-reading of the FPGA configuration, obfuscation and PUF components results in the advantage that no lifting attacks on the obfuscation are possible. In the case of a lifting attack, the attacker removes a part of obfuscated hardware or software and transfers it to his application without change. The attacker does not attempt at all to understand how the removed part functions, but rather simply depends on this part also functioning correctly in his application, as in its original environment. For example, the attacker may lift the obfuscated functionality of a device and may copy it into a new device in its unchanged form in order to clone the original device. One possible way of avoiding lifting attacks involves linking the obfuscated functionality to the individual hardware, for example, by PUF components.

In one embodiment of the method, the correspondence of the first checksum to a predefined checksum is checked and the authentication response is calculated only if there is correspondence. The checking may be carried out, for example, by comparing the first checksum with a predefined checksum. Correspondence may correspond to an authentic configuration of the FPGA.

In one advantageous embodiment, the reading of the FPGA configuration may include complete reading of the FPGA configuration.

In a further advantageous embodiment, the predefined checksum may be formed over a reference configuration of the FPGA.

In one possible embodiment of the method, the predefined checksum includes at least one hash value or at least one result of a cryptographic hash function or one-way function.

In a further possible embodiment of the method, the provision of the authentication response includes generating an asymmetric signature for a predefined authentication task.

In a further possible embodiment of the method, the authentication task includes a nonce. A nonce (number only used once) denotes in this case a value which is used only once. Nonces may be implemented by counters, for example. Random values may also be used as nonces. If the nonces are taken from a sufficiently large set with a suitable distribution, the probability of a value occurring repeatedly is so small that the security risk is negligible.

In this advantageous embodiment, the checking unit knows the public key and the signature checking method. The FPGA is provided with a signed nonce and the FPGA responds to the provided nonce with a signature. The checking unit uses the public key of the asymmetric method which is known to it to check the authenticity of the signature.

In a further possible embodiment of the method, the provision of the authentication response includes decrypting an asymmetrically encrypted message.

In this advantageous embodiment, the checking unit knows the public key and the encryption method.

In a further possible embodiment of the method, the message which is asymmetrically encrypted includes a nonce.

In a further possible embodiment of the method, the provision of the authentication response includes decrypting a symmetrically encrypted message.

This embodiment is possible if the checking unit knows the secret key. In a further embodiment, the secret key is not known to the checking unit. In this embodiment, an obfuscated function for encryption is available to the checking unit in hardware and/or software, in which the secret key is hidden.

In a further possible embodiment, the message includes a nonce.

In a further possible embodiment of the method, the provision of the authentication response includes symmetrically encrypting a message.

This embodiment is possible if the checking unit knows the secret key. In a further embodiment, the checking unit does not know the key. In this embodiment, an obfuscated function for decryption is available to the checking unit in hardware and/or software, in which the secret key is hidden.

An authentication task having the obfuscated function is made available to the FPGA in encrypted form and, if the FPGA may provide a correct authentication response corresponding to the encrypted authentication task, the authenticity of the FPGA configuration may be assumed. Only this may decrypt the encrypted authentication task and provide the correct authentication response.

In a further embodiment, the message includes a nonce.

In the embodiments in which the provision of the authentication response includes symmetric encryption or decryption, it is advantageous to choose an encryption method which is not known to the general public for the purpose of encrypting a message. It is also advantageous to suitably modify parameters, for example constants, even though generally known methods are used.

The encryption is advantageously improved if the encryption methods are not known to an unknown third party (e.g., attacker).

In a further embodiment of the method, the provision of an authentication response includes a signal pattern in the form of one signal or a multiplicity of signals.

This has the advantage that no cryptographic calculation is needed to check the authentication response.

In a further possible embodiment of the method, the obfuscated performance of the reading, the calculating, and the providing acts include data from a physically unclonable function, PUF.

This has the advantage that all or some data provided by the PUF component after an error correction are included in the obfuscated calculation. The PUF component provides different data, which are not known to an attacker, for each chip. The PUF component is provided with a PUF task, and this provides a PUF response which is dependent on the chip used and differs from other chips. These data are not known to an attacker and improve the obfuscation in the obfuscated calculation.

PUF components advantageously provide protection from the production of copies with unchanged original firmware. In addition, the effect of the obfuscation is intensified by the PUF data which are not known to an attacker.

In a further possible embodiment of the method, the predefined checksum is stored in a storage unit outside the FPGA configuration.

This has the advantage that the predefined checksum is not stored in the bitstream or as part of the bitstream and/or the FPGA configuration. The bitstream may be separately stored in the storage unit.

In a further possible embodiment of the method, the predefined checksum is stored in a cryptographically protected form and/or with an item of additional cryptographic information.

In this case, the circuit part of the FPGA configuration which is used to process the cryptographically protected form, and/or the part which verifies the additional information, is/are performed in an obfuscated form which may be separated from the obfuscated components only with great difficulty. This has the advantage that the checksum stored in the storage unit cannot be manipulated.

In a further possible embodiment of the method, the predefined checksum is encrypted using PUF data. A PUF response is generated based on a PUF task. The protection of the predefined checksum for checking the FPGA configuration is increased.

This has the advantage that a plurality of secret test values may be stored in a device-specific manner with different response values of the PUF component. If a checksum has been used, this checksum is reconstructed by the stored data and the device-specific PUF response.

In a further possible embodiment of the method, the first checksum is provided if a specific item of information is transmitted to the FPGA.

In one embodiment, the specific information includes a specific signal pattern, for example, at a multiplicity of inputs of the FPGA configuration.

This signal pattern to be created is advantageously known only to the developers of the system. This signal pattern may be protected in different ways from access by attackers, wherein the protection mechanism may be advantageously implemented in obfuscated form.

The value of the checksum of the FPGA configuration may be read only by developers of the system who know the specific information. Reading of the checksum by attackers for the purpose of manipulation is advantageously prevented. The security against manipulation is increased.

In a further possible embodiment of the method, the specific information is asymmetrically encrypted or signed, is symmetrically encrypted or the specific information is encrypted with data from the PUF.

In the case of asymmetric encryption, only the public key is present in the FPGA, whereas a developer of the system knows the private key.

In a further possible embodiment of the method, data from the PUF are provided if a specific item of information is transmitted to the FPGA.

In one embodiment, the specific information includes a specific signal pattern, for example, at a multiplicity of inputs of the FPGA configuration.

This has the advantage that the specific signal pattern is known only to the developers of the system. The security is increased because access by unknown third parties is hindered.

In a further possible embodiment of the method, the specific information is asymmetrically encrypted or signed or symmetrically encrypted.

Asymmetric encryption has the advantage that access by unknown third parties is hindered. The signal pattern is protected against access because only the public key is stored on the FPGA, whereas a developer knows the associated private key.

Symmetric encryption has the advantage that access by unknown third parties is hindered. The signal pattern is protected against access because the inverse representation to the representation stored on the FPGA is known only to a developer.

In a further possible embodiment of the method, the authentication is carried out during the configuration and/or during the runtime of the FPGA.

In a further possible embodiment of the method, the authentication is carried out repeatedly. For example, security mechanisms are available which trigger an alarm and therefore start a repeated check of the FPGA configuration. Furthermore, the authentication may be carried out in a periodically repeated manner.

This has the advantage that changes to the FPGA configuration, which arise, for example, as a result of manipulation attempts or as a result of random or intentionally caused faults, may be identified and corresponding measures may be taken.

The disclosure also provides a device for authenticating an FPGA configuration.

The device for authenticating an FPGA configuration, is configured in such a manner that a configuration of an FPGA is at least partially read by the FPGA itself, and a first checksum is calculated over the configuration which has been read. The device is further configured in such a manner that an authentication response is provided, which response confirms that the FPGA configuration is authentic if the first checksum corresponds to a predefined checksum, wherein the at least partial reading and calculation of the first checksum and the provision of the authentication response are performed in obfuscated form, and wherein the authentication response which confirms that the FPGA configuration is authentic is not provided or is provided only with a very low degree of probability if the first checksum and the predefined checksum do not correspond.

In one embodiment, the system includes a computing system.

In one embodiment of the device, it is confirmed that the part thereof used to determine the checksum is authentic.

The disclosure also relates to a computer program product which causes the performance of a method for authenticating an FPGA configuration on a physical device.

BRIEF DESCRIPTION OF DRAWINGS

The disclosure is explained in more detail below based on the exemplary implementations with reference to the attached figures.

DETAILED DESCRIPTION

Figure 1:
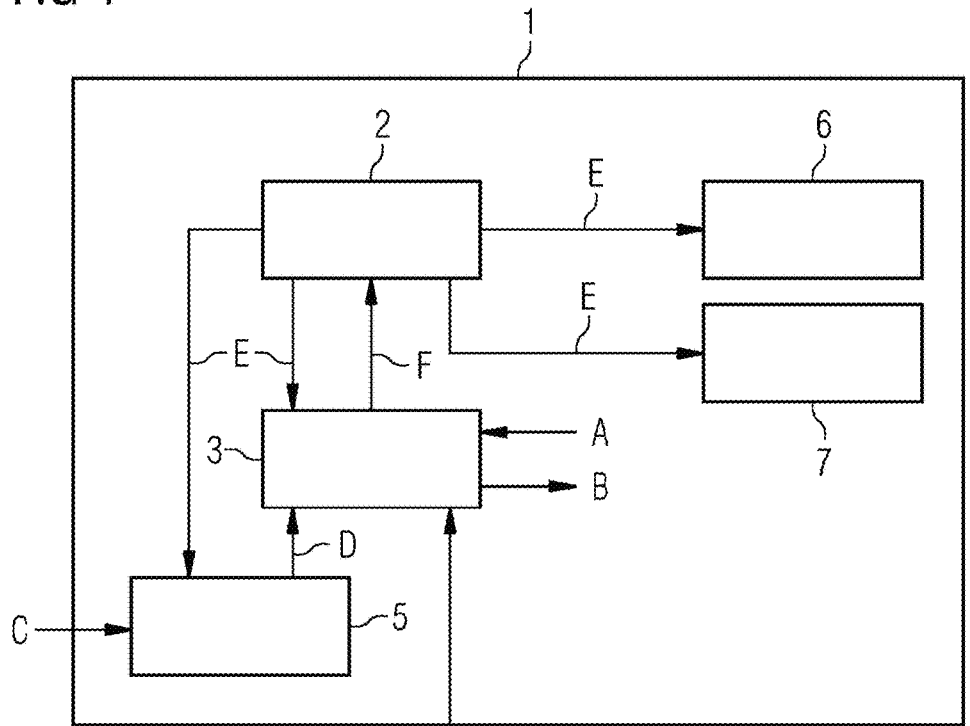
FIG. 1 depicts a block diagram for illustrating an exemplary embodiment of a device for authenticating an FPGA configuration.

FIG. 1 depicts a block diagram for illustrating a possible exemplary embodiment of a device. In the exemplary embodiment illustrated in FIG. 1, the FPGA 1 contains an FPGA configuration 2.

The FPGA configuration 2 is loaded into an SRAM (static random access memory) of the FPGA 1, for example, when starting the FPGA 1 and configures the FPGA.

This installed FPGA configuration 2 is checked during the runtime and the authenticity of the FPGA configuration 2 or a manipulation is determined.

A first component 6 and a second component 7 as well as the checking component 3 and the PUF component 5 are instantiated E via the FPGA configuration 2. For example, the first component 6 and the second component 7 may include a crypto accelerator or a processor. The FPGA configuration 2 may instantiate E further components. The checking component 3 and the PUF component are instantiated E by the FPGA configuration 2.

The checking component 3 checks the FPGA configuration 2. The PUF component 5 receives a PUF task C and provides the checking component 3 with a PUF response D according to the PUF task. The PUF response D remains on the FPGA 1 and is advantageously not used for a further calculation.

The checking component 3 receives the PUF response D from the PUF component 5. The checking component 3 also reads the FPGA configuration 2 from the SRAM and receives an encrypted checksum A for checking the FPGA configuration 2. An authentication response B is provided according to the result of the check.

The authentication response B may be used to determine whether the FPGA configuration 2 running on the FPGA 1 has been compromised. In a further embodiment, the authentication response B includes the output of an alarm in the event of a negative check, for example, if the FPGA configuration 2 has been compromised.

The FPGA 1 is also coupled to a storage unit 4, e.g., an external storage unit 4. The storage unit 4 is coupled to the FPGA 1 via an interface (not illustrated). The storage unit 4 may be in the form of a non-volatile memory, for example, a flash memory.

Further storage elements known in the prior art for use as the storage unit 4 are not excluded by the exemplary list. The predefined checksum is stored in the storage unit 4 in encrypted form. The predefined checksum is made available to the checking component 3 via the interface. The checking component 3 is used to calculate the first checksum in act S1. For this purpose, the FPGA configuration 2 of the FPGA 1 is at least partially self-read F by the FPGA 1.

The checksum is calculated over the FPGA configuration 2 which has been read. The calculated checksum may include a hash value, for example. The calculated checksum is compared with the checksum stored in the storage unit 4. If the calculated checksum and the predefined checksum stored in the storage unit 4 correspond, the phase of authenticating the FPGA configuration 2 begins and an authentication response B is provided.

The authentication response B is obfuscated with the self-read FPGA configuration 2. The at least partial reading and calculation of the first checksum and the comparison of the first checksum with the predefined checksum as well as the provision of the authentication response B are performed in obfuscated form. Therefore, it is advantageously not possible to clearly distinguish between the self-check of the FPGA 1 and the authentication response B.

Figure 2:
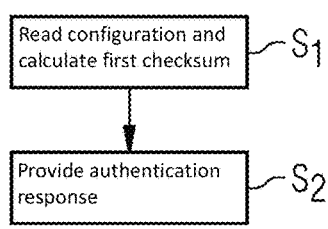
FIG. 2 depicts a flowchart for illustrating a possible exemplary embodiment of a method for authenticating an FPGA configuration.

FIG. 2 depicts a flowchart for illustrating an exemplary embodiment of a method for authenticating an FPGA configuration.

In the exemplary embodiment illustrated, the method includes a plurality of acts. In act S1, the configuration 2 of an FPGA 1 is at least partially read S1 by the FPGA 1 itself and a first checksum is calculated over the configuration 2 which has been read.

In a further act S2, an authentication response B is provided, which response confirms that the FPGA configuration 2 is authentic if the first checksum corresponds to a predefined checksum. Acts S1 and S2 are performed in obfuscated form. The authentication response B which confirms that the FPGA configuration 2 is authentic is not provided or is provided only with a very low degree of probability if the first checksum and the predefined checksum do not correspond.

The predefined checksum corresponds to an authentic configuration of the FPGA 1.

As a result of the FPGA configuration 2, it is therefore reported to the outside that the configuration is authentic and that a calculation is carried out which, without an additional item of additional information, for example, a secret item of additional information which is stored in the FPGA configuration 2, may be carried out only in an extremely complicated manner.

In order to prevent the FPGA configuration 2 from being changed by an attacker in such a manner that an authentication response B is provided even when the FPGA configuration 2 is not authentic, both the circuit for reading and hashing the FPGA configuration and the authentication response B are obfuscated together. Therefore, it is advantageously not clear to an attacker based on the obfuscated network list which circuit parts are used for the self-check and which parts are used to provide the authentication response B.

In summary, the disclosure relates to a method and a device for authenticating an FPGA configuration 2. The method includes at least partially reading S1 the configuration 2 of an FPGA 1 by the FPGA 1 itself and calculating a first checksum over the configuration 2 which has been read. The method further includes providing S3 an authentication response B which confirms that the FPGA configuration 2 is authentic if the first checksum corresponds to a predefined checksum, wherein the reading, the calculating, and the providing are performed in obfuscated form, and wherein the authentication response B which confirms that the FPGA configuration 2 is authentic is not provided or is provided only with a very low degree of probability if the first checksum and the predefined checksum do not correspond.

In this respect, an FPGA may check its configuration itself.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for authenticating a Field Programmable Gate Array (FPGA) configuration, the method comprising:
    at least partially reading the FPGA configuration of an FPGA by the FPGA itself;
    calculating a first checksum over the FPGA configuration which has been read;
    comparing the first checksum with a predefined checksum stored in a storage unit; and
    providing an authentication response which confirms that the FPGA configuration is authentic when the first checksum corresponds to the predefined checksum,
    wherein the reading, the calculating, the comparing, and the providing are performed in obfuscated form such that an attacker cannot distinguish between the authentication response or a self-check of the FPGA,
    wherein the authentication response which confirms that the FPGA configuration is authentic is provided with a non-zero degree of probability that is less than or equal to $2^{-32}$ when the first checksum and the predefined checksum do not correspond,
    wherein the first checksum is provided when a specific item of information is transmitted to the FPGA, and
    wherein the specific item of information comprises one signal or a multiplicity of signals, wherein the same one signal is applied or each signal of the same multiplicity of signals is applied to all inputs of a multiplicity of inputs of the FPGA configuration.

2. The method of claim 1, wherein the predefined checksum comprises at least one hash value or one result of a cryptographic hash function.

3. The method of claim 2, wherein the providing of the authentication response comprises generating an asymmetric signature for a predefined authentication task.

4. The method of claim 2, wherein the providing of the authentication response comprises decrypting an asymmetrically encrypted message.

5. The method of claim 2, wherein the providing of the authentication response comprises decrypting a symmetrically encrypted message.

6. The method of claim 2, wherein the providing of the authentication response comprises symmetrically encrypting a message.

7. The method of claim 1, wherein the providing of the authentication response comprises generating an asymmetric signature for a predefined authentication task.

8. The method of claim 1, wherein the providing of the authentication response comprises decrypting an asymmetrically encrypted message.

9. The method of claim 1, wherein the providing of the authentication response comprises decrypting a symmetrically encrypted message.

10. The method of claim 1, wherein the providing of the authentication response comprises symmetrically encrypting a message.

11. The method of claim 1, wherein the specific item of information is asymmetrically encrypted or signed, symmetrically encrypted, or encrypted with data from a physically unclonable function (PUF).

12. The method of claim 1, wherein data from a physically unclonable function (PUF) component is provided when the specific item of information is transmitted to the FPGA.

13. The method of claim 12, wherein the specific item of information is asymmetrically encrypted, asymmetrically signed, or symmetrically encrypted.

14. The method of claim 1, wherein the method is carried out during a runtime of the FPGA.

15. A Field Programmable Gate Array (FPGA) device for authenticating a FPGA configuration, the FPGA device comprising:
    the FPGA configuration,
    wherein the FPGA device is configured to:
        at least partially read the FPGA configuration of the FPGA device;
        calculate a first checksum over the FPGA configuration which has been read;
        compare the first checksum with a predefined checksum stored in a storage unit; and
        provide an authentication response, wherein the authentication response confirms that the FPGA configuration is authentic when the first checksum corresponds to the predefined checksum,
    wherein the reading, the calculation, the comparison, and the provision are performed in obfuscated form such that an attacker cannot distinguish between the authentication response or a self-check of the FPGA,
    wherein the authentication response which confirms that the FPGA configuration is authentic is provided with a non-zero degree of probability less than or equal to $2^{-32}$ when the first checksum and the predefined checksum do not correspond,
    wherein the first checksum is provided when a specific item of information is transmitted to the FPGA device, and
    wherein the specific item of information comprises one signal or a multiplicity of signals, wherein the same one signal is applied or each signal of the same multiplicity of signals is applied to all inputs of a multiplicity of inputs of the FPGA configuration.

* * * * *